(12) United States Patent
Khaira et al.

(10) Patent No.: US 12,451,575 B2
(45) Date of Patent: Oct. 21, 2025

(54) MAGNETLESS CRYOGENIC CIRCULATOR

(71) Applicants: Navjot Kaur Khaira, Kanata (CA); Tejinder Singh, Kanata (CA); Mehran Golcheshmeh, Waterloo (CA); Raafat Rezk Mansour, Waterloo (CA)

(72) Inventors: Navjot Kaur Khaira, Kanata (CA); Tejinder Singh, Kanata (CA); Mehran Golcheshmeh, Waterloo (CA); Raafat Rezk Mansour, Waterloo (CA)

( * ) Notice: Subject to any disclaimer, the term of this patent is extended or adjusted under 35 U.S.C. 154(b) by 179 days.

(21) Appl. No.: 18/236,198

(22) Filed: Aug. 21, 2023

(65) Prior Publication Data

US 2024/0372241 A1  Nov. 7, 2024

Related U.S. Application Data

(60) Provisional application No. 63/400,027, filed on Aug. 22, 2022.

(51) Int. Cl.
*H01P 1/397* (2006.01)
*G06N 10/40* (2022.01)
*H01P 1/387* (2006.01)

(52) U.S. Cl.
CPC ............ *H01P 1/387* (2013.01); *G06N 10/40* (2022.01); *H01P 1/397* (2013.01)

(58) Field of Classification Search
CPC .... H01P 1/32; H01P 1/36; H01P 1/362; H01P 1/365; H01P 1/37; H01P 1/38; H01P 1/387; H01P 1/397; H01P 1/393; G06N 10/00; G06N 10/20; H10N 60/12; H10N 60/805

See application file for complete search history.

(56) References Cited

U.S. PATENT DOCUMENTS

| | | | | |
|---|---|---|---|---|
| 4,801,901 | A * | 1/1989 | Ayasli | H01P 1/397 333/1.1 |
| 9,405,136 | B2 * | 8/2016 | Alu | G02B 26/08 |
| 11,677,129 | B2 * | 6/2023 | Stace | H01P 1/397 333/1.1 |
| 2019/0372192 | A1 * | 12/2019 | Mueller | H01P 1/38 |

* cited by examiner

*Primary Examiner* — Stephen E. Jones
(74) *Attorney, Agent, or Firm* — Nasser Ashgriz; UIPatent Inc.

(57) ABSTRACT

A magnetless cryogenic circulator is developed that has three identical resonators in three branches. Each branch connects two ports and each resonator has a capacitor connected across a tunable inductor. A set of tunable inductors modulated with modulation signals that have a relative phase of 0°, 120° and 240° provided through a circuit. A microstrip delay line for providing the modulation signal to the three resonators, wherein the resonators are modulated in time such that the degeneracy of the two inherent counter-rotating modes is lifted, achieving a non-reciprocal signal routing. All capacitors and inductors are monolithically integrated and fabricated using a multi-layer Nb-based process with Nb/AlOx/Nb JJs.

14 Claims, 16 Drawing Sheets

MAGNETLESS CRYOGENIC CIRCULATOR

FIELD OF THE INVENTION

The present invention relates generally to microwave circuits, and more particularly to the realization of magnet-free cryogenic circulator for application in quantum measurement circuits and in front-end circuits of superconductor digital receivers.

BACKGROUND OF THE INVENTION

Quantum computers accelerate the speed of computational process by harnessing capabilities of qubit (Quantum Bit) devices with their significant speed advantage over conventional digital logic gates. Constructing a quantum computer, not only needs for qubit devices, but also necessitates incorporation of devices that connect the qubit devices and signal transmission. One of such devices is circulator which is a nonreciprocal network with three or more ports, that establishes unidirectional connection between the ports in clockwise (or counterclockwise) direction, enhancing the signal flow.

Traditionally, circulators were engineered using ferrite material and magnetic field generated by using two permanent magnets positioned above and below the circuit as described in D. M. Pozar (Microwave Engineering, 4th edition, John Wiley, 2005). This magnetic field can interfere with the quantum circuitry and make these circulators unsuitable for quantum computation.

U.S. Pat. No. 9,880,403B2 introduces a circulator that eliminates the reliance on magnetic fields. This innovation achieves non-reciprocity by utilizing angular momentum biasing of resonators constructed with varactors. This method is exploited by employing different technologies such as CMOS integration and MEMS, respectively, in A. Kord et al., "CMOS Integrated Magnetless Circulators Based on Spatiotemporal Modulation Angular-Momentum Biasing," IEEE Trans MTT, vol. 67, no. 7, pp. 2649-2662 (July 2019), and Y. Yu et al., "Highly-Linear Magnet-Free Microelectromechanical Circulators," *JMEMS*, vol. 28, no. 6, pp. 933-940 (December 2019). Eliminating the magnetic field is a major step for implementing circulators in quantum computing devices, however, varactors made with any of available technologies are not suitable with the technology of low temperature super conductivity employed in quantum computing circuits.

Given the incompatibility of the available technologies, there exist a need for develop circulators compatible with the low temperature superconductivity.

SUMMARY OF THE INVENTION

The present invention is a magnetless cryogenic circulator. It comprises of three resonators circularly connected through a set of branches. Each branch connects two ports and each resonator has a capacitor connected across a tunable inductor. A set of tunable inductors modulated with modulation signals that have a relative phase angle of 0°, 120° and 240° are provided in the circuit. Different number of resonators and phases can also be designed. The circulator further has a microstrip delay line for providing the modulation signal to the set of resonators. The resonators are modulated in time configured to lift the degeneracy of the two inherent counter-rotating modes, achieving a non-reciprocal signal routing. The capacitors and inductors are monolithically integrated and fabricated using a multi-layer Nb-based process with Nb/AlOx/Nb JJs.

BRIEF DESCRIPTION OF THE DRAWINGS

A better understanding of the present invention can be obtained when the following detailed description is considered in conjunction with the following figures.

DETAILED DESCRIPTION

Figure 1:
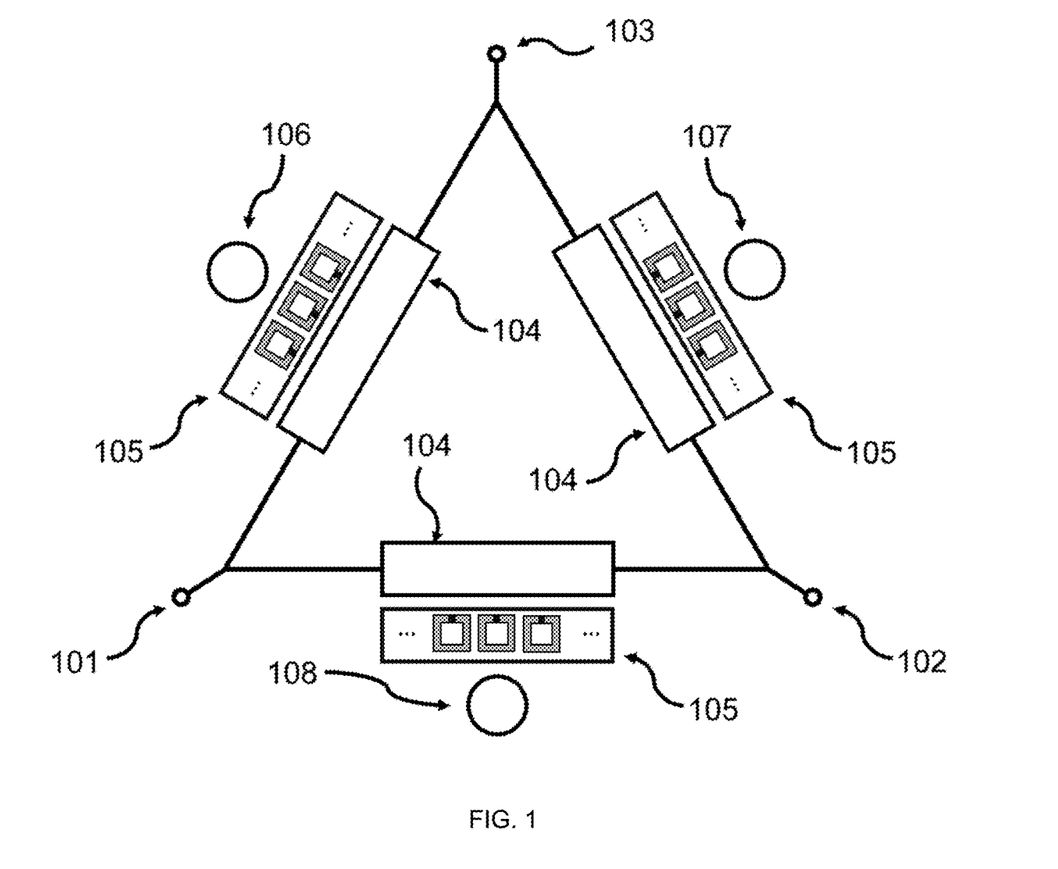
FIG. 1 shows the generalized schematic of one embodiment of the present invention for non-reciprocal transmission of RF signal between the three ports.

FIG. 1 shows generalized schematic of the presently disclosed magnetless cryogenic circulator. It comprises of a three port circulator, a first port 101, a second port 102, and a third port 103. A set of tunable resonator 104, which can be any kind of resonator that allows the required tunning. A set of rf-SQUID arrays 105, which are used for controlling the inductance and frequency of the resonator. A set of actuation signals of the resonators with relative phases of 0°, 120°, and 240°, respectively, 106, 107, and 108.

Principle of Operation: The technique used here to accomplish magnetic-free nonreciprocity is founded on angular momentum biasing of a resonant ring. In case of acoustic waves, mechanically spinning a fluid generates the angular momentum required to achieve non-reciprocity. In case of electromagnetic waves, an effective electronic spin can be realized by spatiotemporal modulation using a travelling wave.

Figure 2:
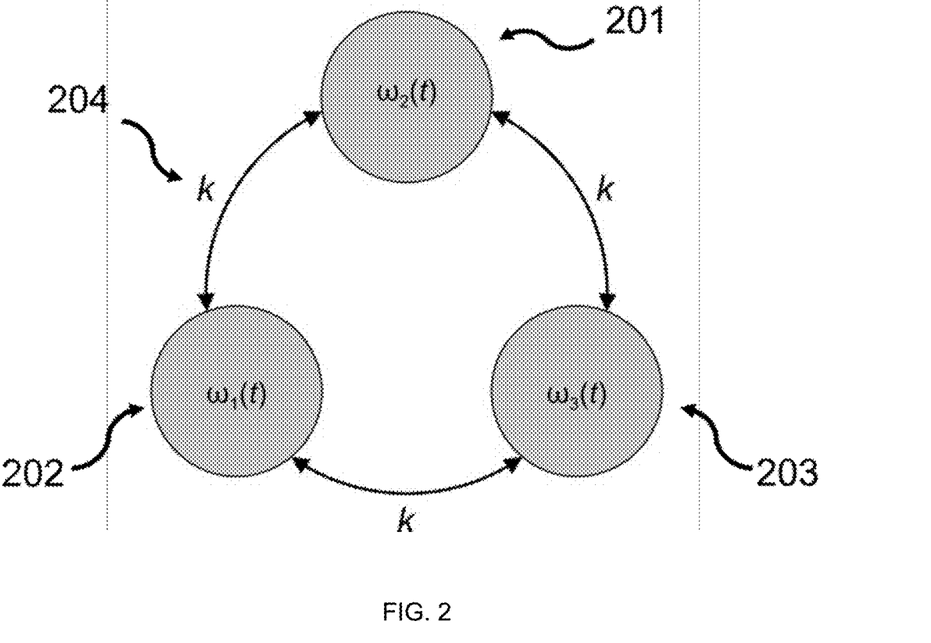
FIG. 2 describes the concept of spatio-temporal modulation angular momentum for achieving the non-reciprocal operation.

The primary circuit topology is shown in FIG. 2. The scheme is based on the parametric modulation of three identical, strongly, and symmetrically coupled resonators arranged in a loop. In one embodiment, three LC resonators are connected in a delta topology. This circuit does not allow transmission to any port without modulation, however, when angular momentum is imparted, the degenerate modes of the loop split, allowing nonreciprocal transmission. The resonators are coupled with coupling factor of k and modulated the resonance frequency of the three resonators with $\omega_1(t)$, $\omega_2(t)$, $\omega_3(t)$.

Figure 3:
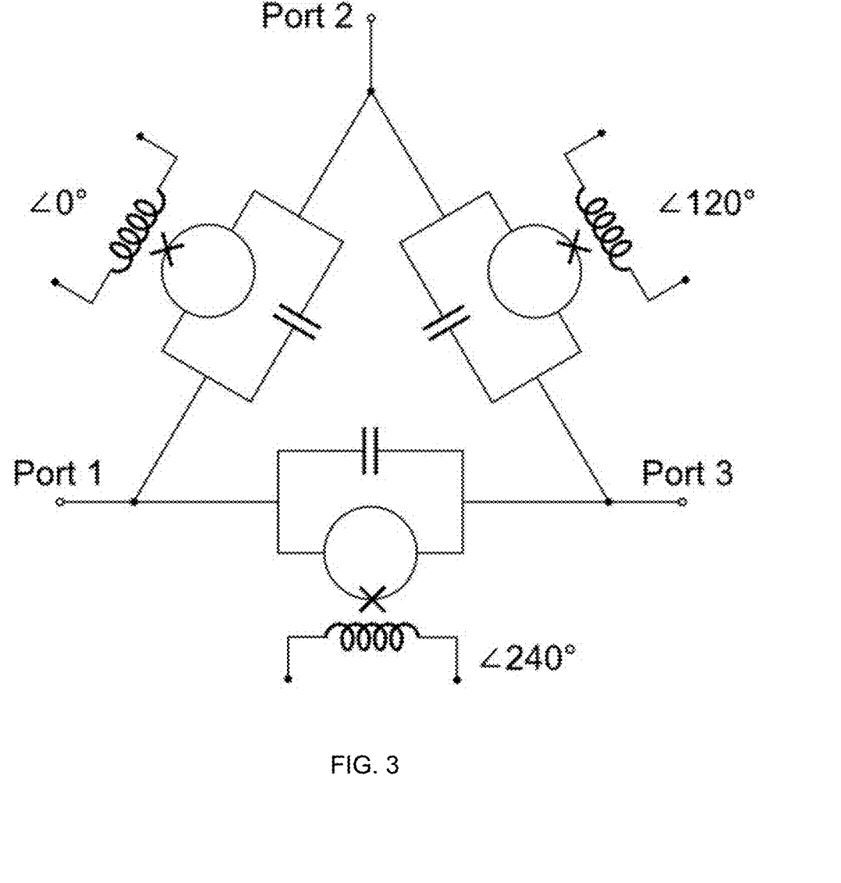
FIG. 3 shows another embodiment of the present invention of a superconducting circulator with tunable inductors using rf SQUID with Δ topology.

FIG. 3 shows another embodiment of the present invention with a superconducting circulator based on synthetic rotation. Three rf SQUIDs are modulated by RF signal 120° out of phase from each other. The phase progression between the three modulating signals establishes the direction of circulation. The resonators are arranged in delta topology.

Figure 4:
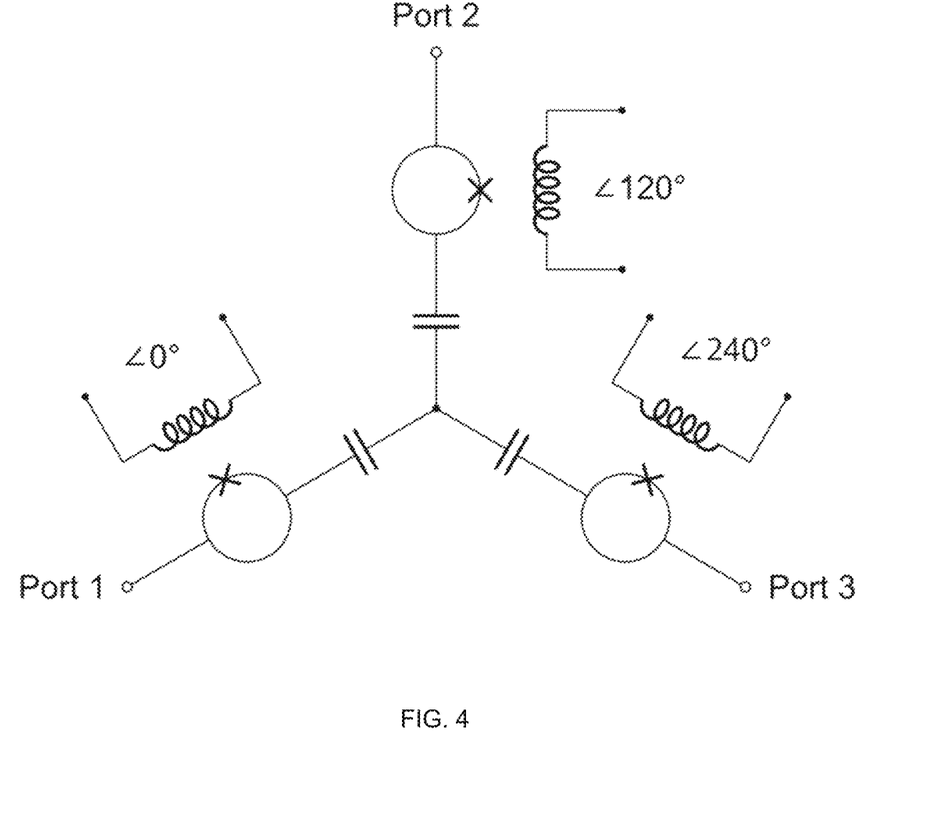
FIG. 4 shows another embodiment of the present invention of a superconducting circulator with tunable inductors using rf SQUID with Y topology.
Figure 5:
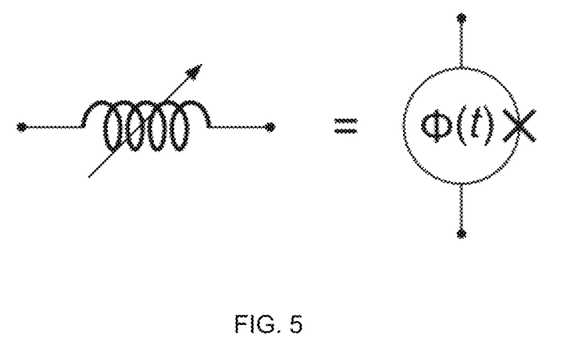
FIG. 5 shows RF SQUID used to fabricate tunable inductor.
Figure 6:
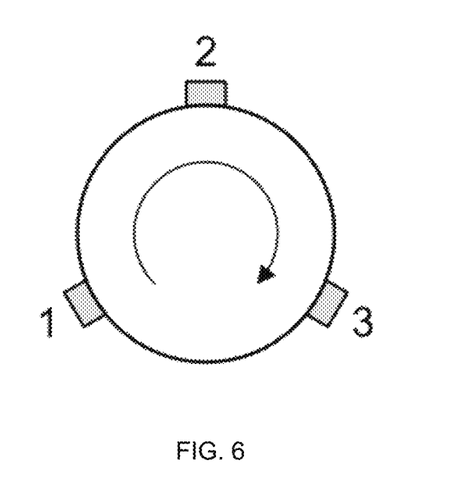
FIG. 6 shows symbol of three port circulator indicating the direction of signal circulation.

FIG. 4 shows another possible embodiment of the present circulator with arrangement of resonators in Y topology. A proper modulation of resonators can lead to circulator operation. FIG. 5 indicates that rf SQUID is used as a tunable inductor and FIG. 6 shows the direction of the circulation in the circuit.

Each resonator consists of a fixed value capacitor connected to an rf-SQUID or to a transmission line coupled to an array of rf-SQUIDs, which acts as a flux-tunable inductor. The flux modulation is achieved by coupling the SQUID to a fixed coil which provides the modulated rf signal. The rf-SQUIDs inductively coupled to external bias are used as the non-linear element. The resonant frequencies of the individual tanks are modulated by external signals with the same amplitude and a relative phase difference of 120°, imparting an effective electronic angular momentum to the system. Three oscillatory microwave tones are required to modulate the inductance and, therefore, the frequency of three resonant circuits in a cyclic manner.

The circuit can be represented as three resonators with resonance frequencies of $\omega_1(t)$, $\omega_2(t)$, and $\omega_3(t)$ coupled to each other with a coupling coefficient k. Without modulation, all the three LC tanks resonate at the same frequency of $$\omega_1 = \omega_2 = \omega_3 = \omega_0 = 1/\sqrt{L_0 C}$$

with temporal modulation $$\omega_1(t) = \omega_0 + a_m \cos(\omega_m t)$$
$$\omega_2(t) = \omega_0 + a_m \cos(\omega_m t + 2\pi/3)$$
$$\omega_3(t) = \omega_0 + a_m \cos(\omega_m t + 4\pi/3)$$

where $\omega_0$ is the static value of the resonant frequency, $a_m$ is the modulation amplitude and $\omega_m$ is the modulation frequency. The currents flowing through the three resonators can be interpreted as a superposition of two counter-rotating modes. Without modulation, these two counter-rotating modes are degenerate, consequently, if a signal is applied from one port, transmission to the other ports is equal and the network is reciprocal. When modulation applied, it synthesizes an effective angular-momentum bias in the clockwise direction because the phases of the modulation signals increase by 120° in that direction, thus lifting the degeneracy of the rotating modes and enabling them to oscillate at different frequencies, achieving a nonreciprocal routing of the signals between the ports. It can be seen that by choosing proper modulation amplitude and frequency, the two modes interfere destructively at one port and constructively at the other port, thus fulfilling the operation of a circulator. This theory is validated with simulations as follows.

Simulations: A Matlab Simulink model is developed based on the present circuit topology. Three resonators, each consisting of a variable inductor connected across a fixed capacitor, are connected in delta topology. The modulation signal is applied in a clockwise manner with 120° phase increment between the successive ports. Ideally, the signal applied at port 1 should be routed entirely to port 2 (with minimal insertion loss), with no signal at port 3 (maximum isolation). In order to find the values of frequency and amplitude of the modulation signal that will lead to the desired circulation operation, the input signal transmission to all the three ports is noted for a sweep of frequency values and amplitude.

Figure 7A:
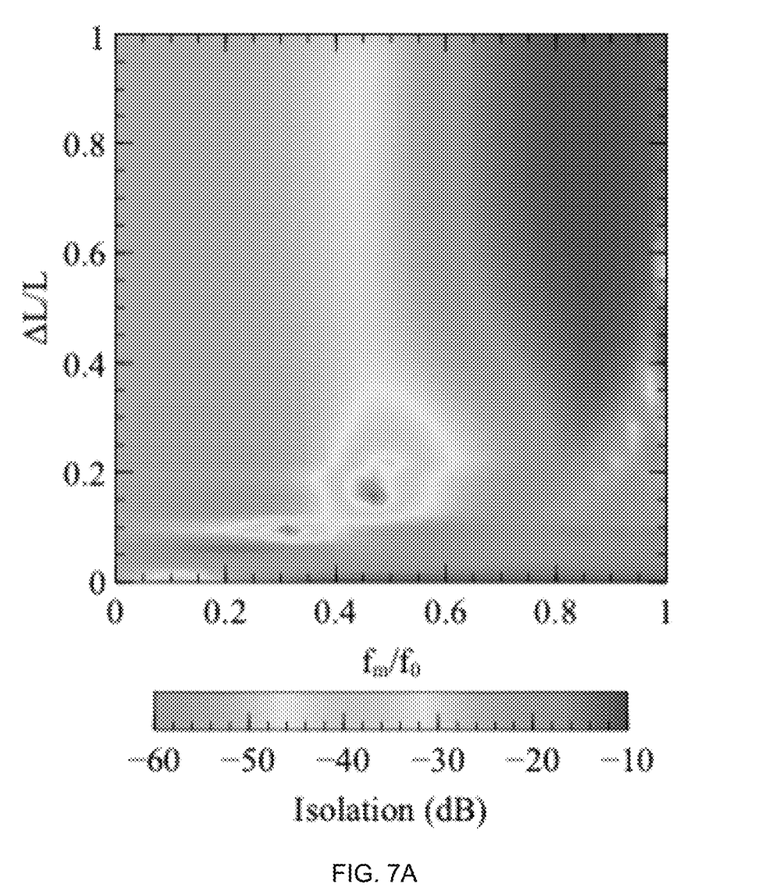
FIG. 7A illustrates the simulation of surface plots of isolation versus the normalized modulation frequency and normalized modulation amplitude.
Figure 7B:
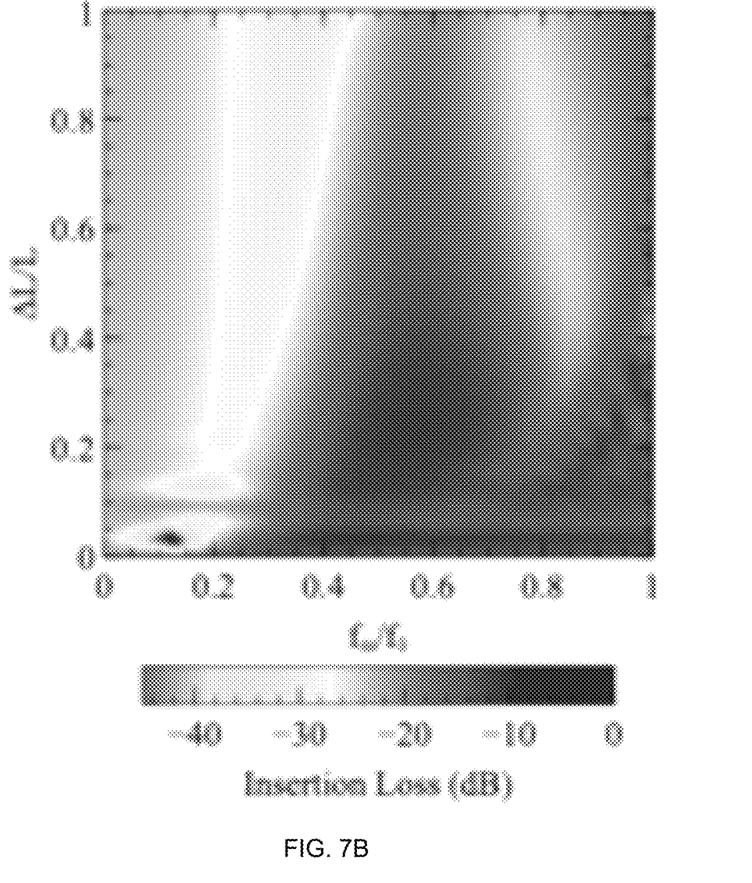
FIG. 7B illustrates the simulation of surface plots of insertion loss versus the normalized modulation frequency and normalized modulation amplitude.
Figure 7C:
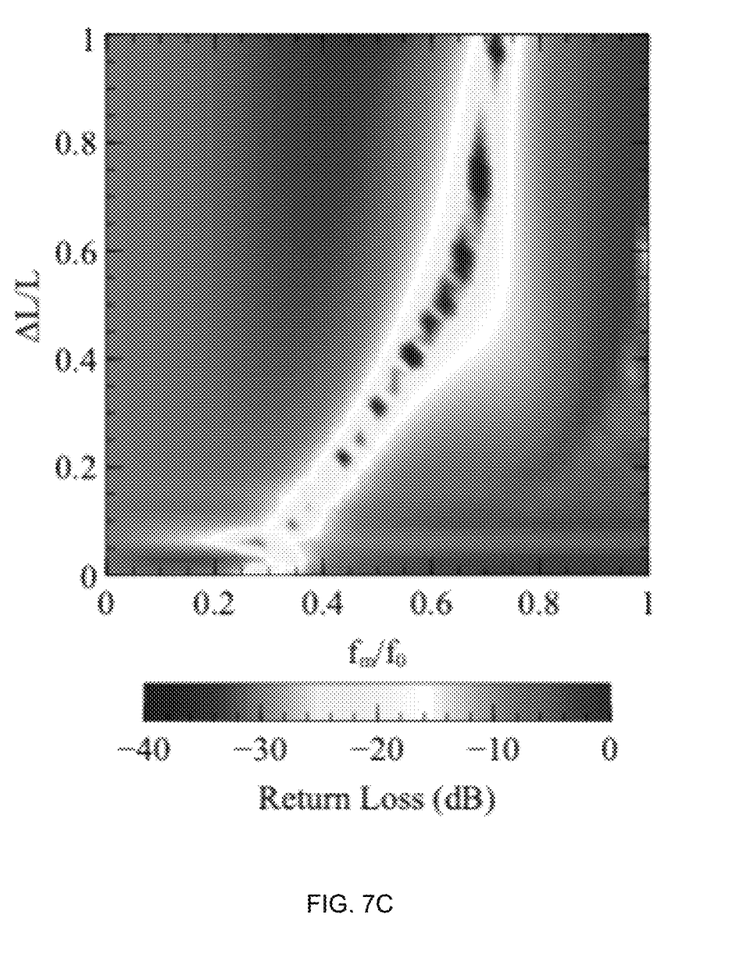
FIG. 7C illustrates the simulation of surface plots of return loss versus the normalized modulation frequency and normalized modulation amplitude.
Figure 8:
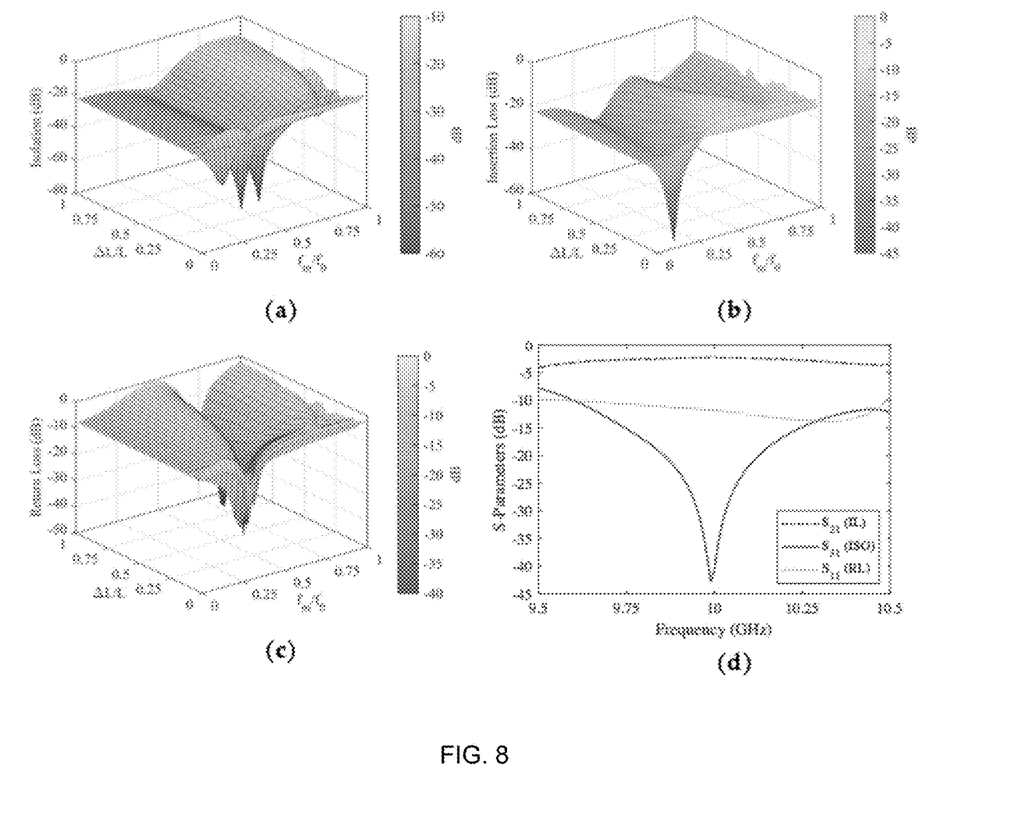
FIG. 8 illustrates the 3D plots of isolation, insertion loss and return loss versus the normalized modulation frequency and normalized modulation amplitude. The nonreciprocal operation verified by the simulated S-parameters for selected values for modulation frequency and modulation amplitude.

FIGS. 7A-C and FIG. 8 show the surface plots of S-parameters versus the normalized modulation frequency and normalized modulation amplitude with being Isolation, Insertion Loss, and Return Loss, respectively. FIG. 7A-C show the S-parameters versus the normalized modulation frequency $f_m/f_0$ and normalized modulation amplitude $\Delta L/L_0$ for $f_0$=10 GHZ, C=0.76 pF, and $L_0$=0.37 nH. For a signal applied at port 1, FIG. 7A shows the surface plot of transmitted signal (in dB) to port 3 (isolation), while FIG. 7B shows the signal (in dB) received at port 2 (insertion loss). FIG. 7C shows the reflected signal (in dB) back to port 1 (return loss). FIG. 8(a-c) shows the 3D plots of isolation ($S_{31}$), insertion loss ($S_{21}$) and return loss ($S_{11}$). FIG. 8(a-c) allow us to find the modulation parameters for which the S-parameters become optimum, ideally, with minimum return loss, minimum insertion loss, and maximum isolation. These modulation parameters depend on the circuit configurations. The selected modulation frequency is 1.63 GHZ, and the amplitude is 0.47 times the inductance L0. Using these selected values, the S-parameters of the circulator are shown in FIG. 8(d). The values for isolation, IL, and RL at the center frequency of 10 GHz are 43 dB, 12 dB and 2 dB, respectively. Due to circulator's threefold rotational symmetry, the rest of the S-parameters can be found by rotating the indices as (1,2,3)→(2,3,1)→(3,1,2).

Design Details: In the design implementation, each resonator consists of a MIM capacitor, C, connected in parallel with a meandered microstrip inductor, L, as shown in FIG. 5. The resonator design is simulated using Sonnet EM and the resonance is observed at 10 GHz. In order to make the inductor tunable, an array of 34 rf-SQUIDs is placed along the length of the inductor. The circulator design has three branches arranged in a delta fashion, where each branch connects two consecutive RF ports. A resonator is placed in each of these branches.

Figure 9:
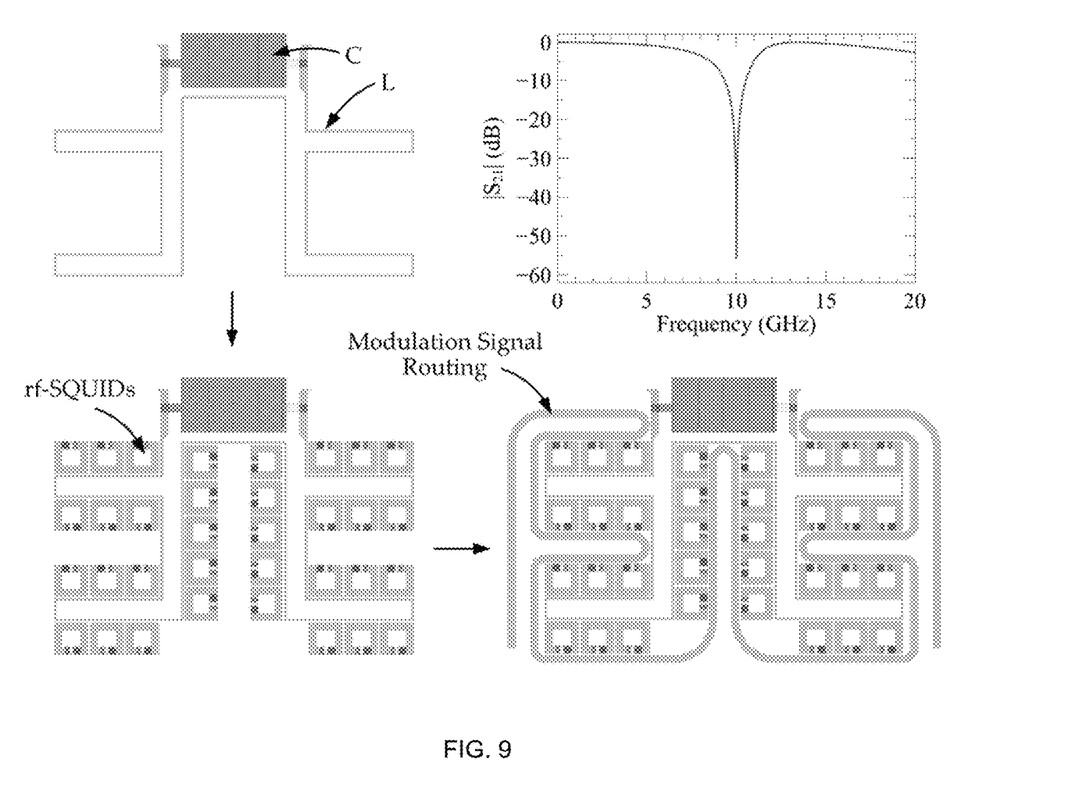
FIG. 9 illustrates the step-by-step process for design of a single resonator including the Metal-insulator-metal (MIM) capacitor, microstrip inductor and rf-SQUIDs.

FIG. 9 shows the resonator design steps: (1) a MIM capacitor and microstrip inductor, the Sonnet EM simulation for the resonator, (2) rf-SQUIDs coupled to the inductor, (3) modulation signal routed alongside the rf-SQUIDs.

Modulation is applied using a delay line placed alongside the rf-SQUIDs. The length of the delay line between two consecutive resonators is adjusted such that it provides a phase delay of 120° at the modulation frequency of 1.63 GHZ.

Figure 10:
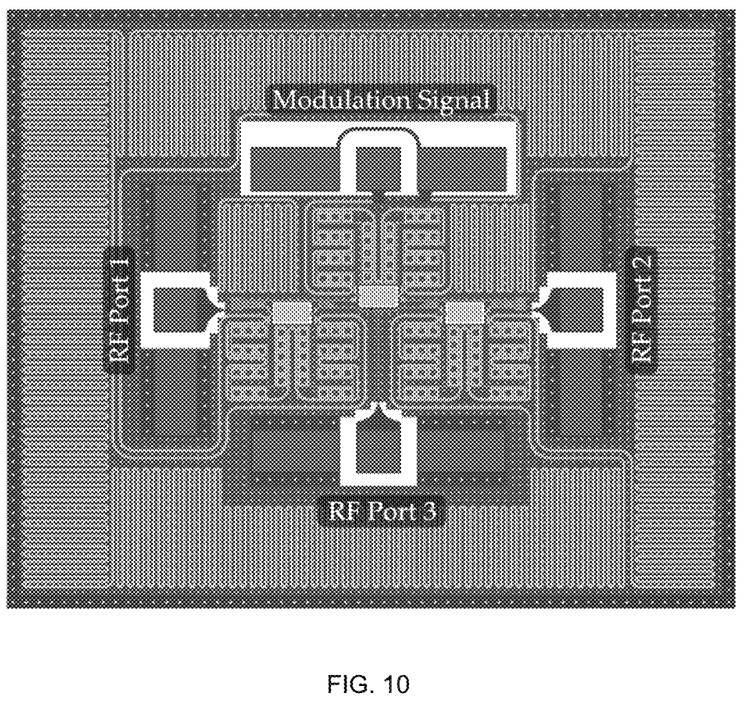
FIG. 10 shows a 2D layout of the superconducting magnetless circulator consisting of three resonators and the meandered delay lines.

The complete circulator layout is shown in FIG. 10, consisting of three identical resonators connected in delta topology. The signal is provided from the three RF ports and an additional port for providing the modulation signal. The modulation signal from the port is provided to first resonator, which after meandering is provided to second resonator with a phase delay of 120°. The signal is provided to the third resonator after an additional meandered length providing a phase of 240°.

Figure 11:
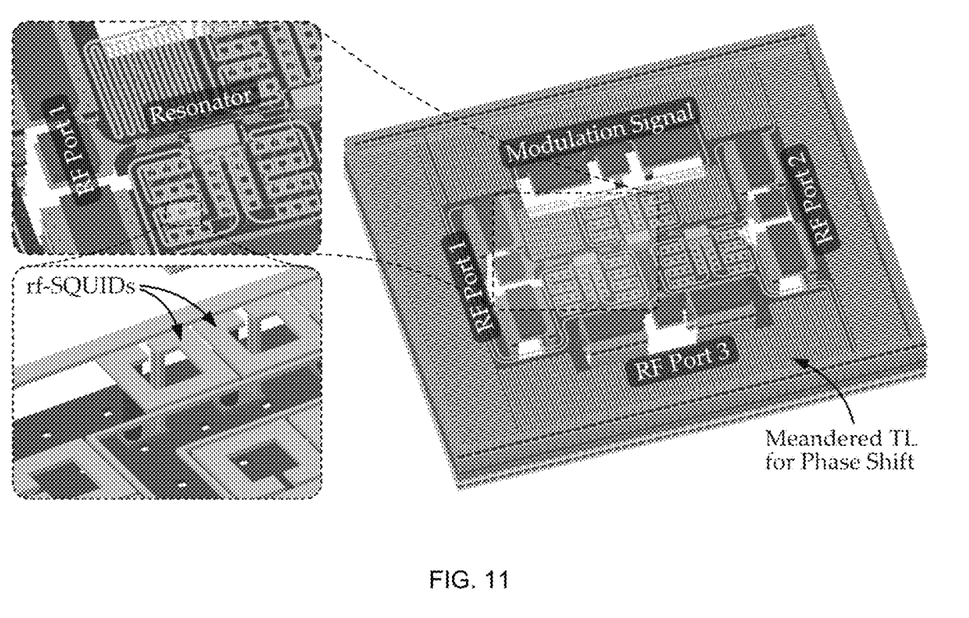
FIG. 11 shows a 3D layout of the monolithically integrated design of superconducting magnetless circulator.

FIG. 10 is a 2D layout of the superconducting magnetless circulator consisting of three resonators and the meandered delay lines. FIG. 11 shows a 3D layout image of the monolithically integrated superconducting magnetless circulator. The resonator structure and rf-SQUIDs are highlighted. It highlights the multi-layer design of the circulator. The highlighted sections show the resonator and the rf-SQUIDs. The rf-SQUID loop is designed on the same layer as the microstrip conductor and is shunted by a JJ. The cryogenic circulator is fabricated using superconducting Nb 8-layer fabrication process. The overall device footprint is 0.88 mm×1.08 mm, however each resonator is 0.15 mm×0.21 mm. If one of the ports of the proposed device is terminated in matched load, the circulator will function as an isolator which is another useful superconductor-based microwave component.

Figure 12:
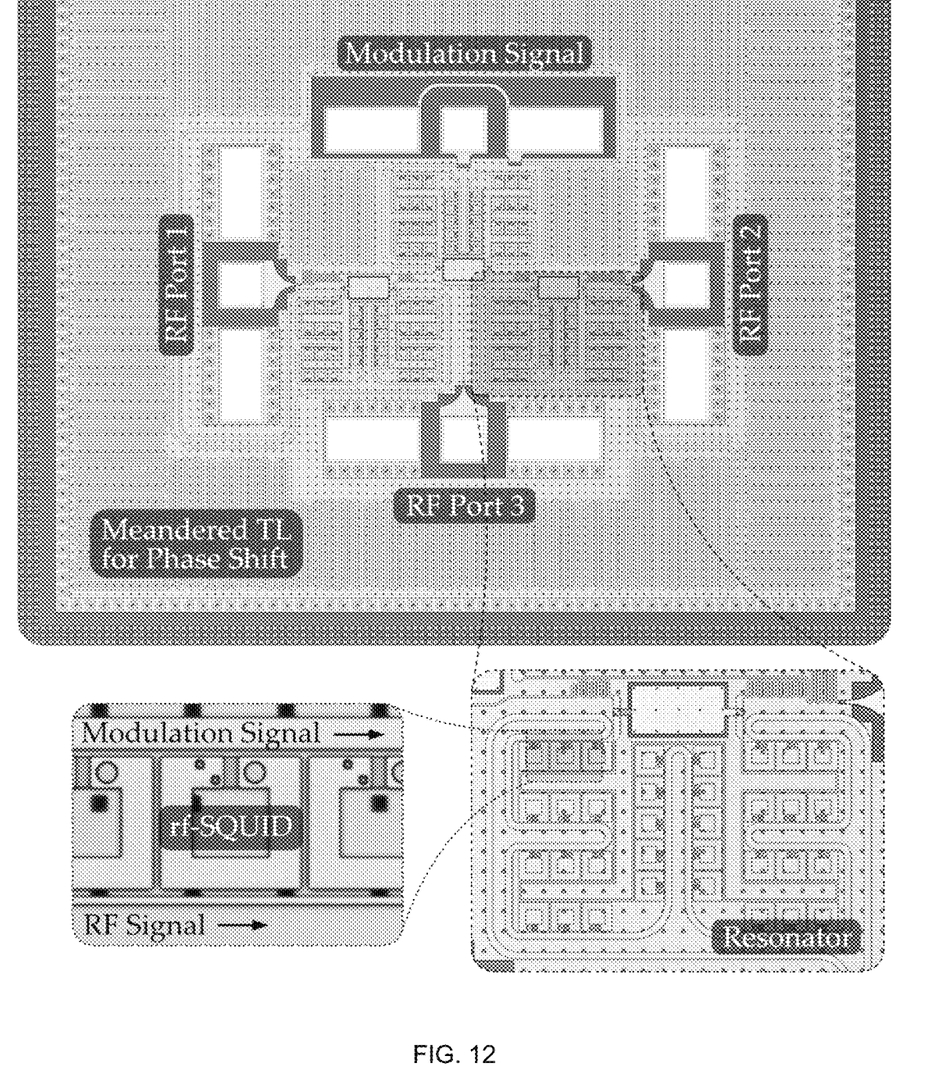
FIG. 12 shows the optical micrograph of the invention proposed for non-reciprocal transmission of RF signal between the three ports.

FIG. 12 shows optical micrograph of the developed magnetless cryogenic circulator showing the three RF ports and one additional port for modulation signal. Three resonators are arranged in the center of the device surrounded by a meandered microstrip delay line. The highlighted section shows one of the three identical resonators and the array of rf-SQUIDs used in each resonator.

Figure 13A:
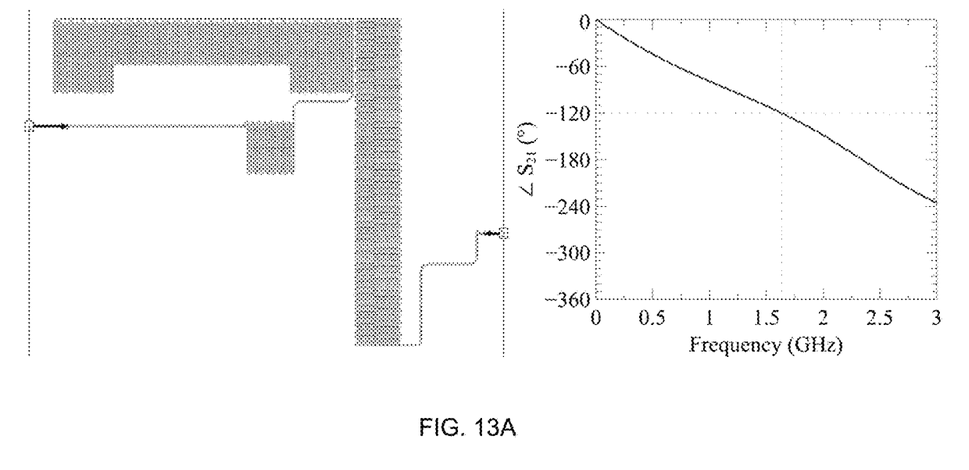
FIG. 13A is Sonnet EM model of a meandered microstrip line with simulated phase of 120° at 1.63 GHz.
Figure 13B:
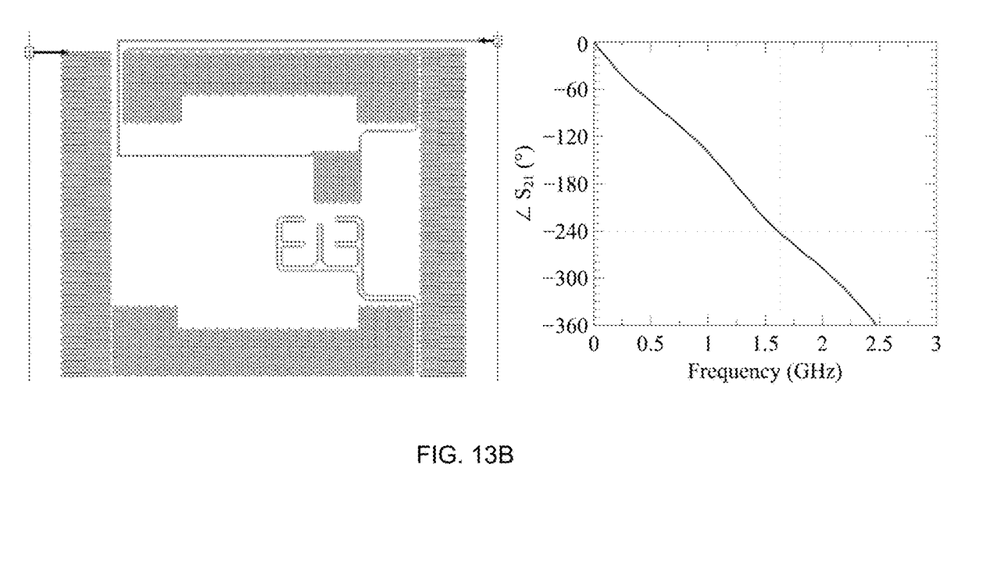
FIG. 13B is Sonnet EM model of a meandered microstrip line with simulated phase of 240° at 1.63 GHz.

FIG. 13A shows the meandered microstrip line model simulated in Sonnet EM and the $\angle S_{21}$ of 120°. Another meandered microstrip section is shown in FIG. 13B, displaying a $\angle S_{21}$ of 240°. FIG. 13A is Sonnet EM model of a meandered microstrip line with simulated phase of 120° at 1.63 GHZ. FIG. 13B is Sonnet EM model of a meandered microstrip line with simulated phase of 240° at 1.63 GHZ.

The invention claimed is:

1. A magnetless cryogenic circulator, comprising:
   a. a plurality of resonators circularly connected through a set of branches, wherein each branch connects two ports, each resonator has a capacitor connected across a tunable inductor of a set of tunable inductors;
   b. each of the tunable inductors modulated with modulation signals that have a relative phase with a predefined phase angle, provided through a circuit, and
   c. a microstrip delay line providing the modulation signals to the plurality of resonators, wherein each resonator is modulated in time configured to lift a degeneracy of a two inherent counter-rotating modes, achieving a nonreciprocal signal routing.

2. The magnetless cryogenic circulator as recited in claim 1, wherein the plurality of resonators comprises three identical resonators in each respective branch of the set of branches, wherein the number of branches is three.

3. The magnetless cryogenic circulator as recited in claim 2, wherein the predefined phase angles of the respective branches are 0°, 120° and 240°.

4. The magnetless cryogenic circulator as recited in claim 1, wherein the capacitors and the set of tunable inductors are monolithically integrated and fabricated using a multi-layer Nb-based process with Nb/AlOx/Nb Josephson Junctions (JJs).

5. The magnetless cryogenic circulator as recited in claim 1, wherein the set of tunable inductors are radio frequency Superconducting Quantum Interference Devices (rf-SQUIDs).

6. The magnetless cryogenic circulator as recited in claim 5, wherein one or more of said radio frequency Superconducting Quantum Interference Devices (rf-SQUIDs) is placed on one side of a transmission line (TL), directly below the TL, or embedded across the TL to achieve a tunable inductance of the tunable inductor.

7. The magnetless cryogenic circulator as recited in claim 1, wherein the set of tunable inductors are realized using a transmission line coupled to an array of radio frequency Superconducting Quantum Interference Devices (rf-SQUIDs).

8. The magnetless cryogenic circulator as recited in claim 1, wherein the set of tunable inductors are a superconducting loop with one or multiple Josephson Junctions (JJs).

9. The magnetless cryogenic circulator as recited in claim 1, wherein the phase of modulation signals increases by 120° in the clockwise/counterclockwise direction, synthesizing an effective angular-momentum bias in that direction, achieving a nonreciprocal routing of the signals between the ports, wherein a phase progression between modulating signals establishes a direction of circulation.

10. The magnetless cryogenic circulator as recited in claim 1, wherein the amplitude and frequency of modulation signals is such that two modes interfere destructively at one port and constructively at another port, thus fulfilling an operation of the circulator.

11. The magnetless cryogenic circulator as recited in claim 1 further comprising: a matched load at one of the ports to achieve an isolator, wherein an input signal from a first port is transmitted to a second port but not in opposite direction.

12. The magnetless cryogenic circulator as recited in claim 1, wherein the modulation signals is provided by applying external magnetic field/flux to radio frequency Superconducting Quantum Interference Devices (rf-SQUIDs).

13. The magnetless cryogenic circulator as recited in claim 1, wherein modulation signals are applied to an RF input signal at one of ports of circulator.

14. The magnetless cryogenic circulator as recited in claim 1, wherein the magnetless cryogenic circulator comprises of high temperature superconductors (HTS) or low temperature superconductors (LTS).

* * * * *